(12) United States Patent
Misiak et al.

(10) Patent No.: US 6,547,917 B1
(45) Date of Patent: Apr. 15, 2003

(54) ACTIVATOR FOR CYANOACRYLATE ADHESIVES

(75) Inventors: Hanns Misiak, Guetersloh (DE); Ingolf Scheffler, Neuss (DE)

(73) Assignee: Henkel Kommanditgesellschaft auf Aktien, Duesseldorf (DE)

( * ) Notice: Subject to any disclaimer, the term of this patent is extended or adjusted under 35 U.S.C. 154(b) by 0 days.

(21) Appl. No.: 09/869,504

(22) PCT Filed: Dec. 14, 1999

(86) PCT No.: PCT/EP99/09896

§ 371 (c)(1),
(2), (4) Date: Feb. 12, 2002

(87) PCT Pub. No.: WO00/39229

PCT Pub. Date: Jul. 6, 2000

(30) Foreign Application Priority Data

Dec. 23, 1998 (DE) .......................................... 198 59 638

(51) Int. Cl.⁷ ............................................. C09J 101/00
(52) U.S. Cl. ............................... 156/331.2; 106/287.3; 156/305; 156/310; 156/314; 526/298
(58) Field of Search ............................. 106/FOR 287.3; 526/298; 156/331.2, 305, 310, 314

(56) References Cited

U.S. PATENT DOCUMENTS

| | | |
|---|---|---|
| 3,254,111 A | 5/1966 | Hawkins et al. |
| 3,542,639 A | 11/1970 | Manino |
| 3,654,340 A | 4/1972 | Banitt |
| 3,836,377 A | 9/1974 | Delahunty |
| 4,460,759 A | 7/1984 | Robins |
| 4,718,966 A | 1/1988 | Harris et al. |
| 5,312,864 A | 5/1994 | Wenz et al. |

FOREIGN PATENT DOCUMENTS

| | | |
|---|---|---|
| DE | 1 719 161 | 5/1971 |
| DE | 2 261 261 | 7/1973 |
| DE | 278 033 | 4/1990 |
| DE | 40 09 621 | 10/1991 |
| EP | 0 579 476 | 1/1996 |
| GB | 2 200 124 | 7/1988 |
| JP | 62 22877 | 1/1987 |
| JP | 03 207778 | 9/1991 |
| JP | 10-140091 | 5/1996 |

OTHER PUBLICATIONS

"Ullmann's Encyclopedia of Industrial Chemistry," 5th Edition, vol. A1, p. 240, Verlag Chemie Weinheim, 1985.

Primary Examiner—John J. Gallagher
(74) Attorney, Agent, or Firm—Stephen D. Harper; Glenn E. J. Murphy

(57) ABSTRACT

Organic compounds containing the structural element —N=C—S—S—C=N— are suitable in dilute solution as activators for the accelerated hardening of cyanoacrylate adhesives. As compared with the known accelerators, they have the following advantage: good accelerating action, but they nevertheless permit a long waiting time between application of the activator and application of the adhesive. In addition, they avoid spontaneous, merely superficial hardening.

20 Claims, No Drawings

ACTIVATOR FOR CYANOACRYLATE ADHESIVES

CROSS-REFERENCE TO RELATED APPLICATIONS

This application is a U.S. National Stage application filed under 35 U.S.C. §371, claiming priority under 35 U.S.C. §§119 and 365 of International Application No. PCT/EP99/09896, filed Dec. 14, 1999, in the European Patent Office and DE 198 59 638.3, filed on Dec. 23, 1998, in the German Patent Office.

This invention relates to activators for the accelerated hardening of cyanoacrylate adhesives and to a process for the accelerated bonding of substrates using cyanoacrylate adhesives.

As is known, adhesives that contain one or more esters of 2-cyanoacrylic acid are distinguished by the fact that they are suitable for the bonding of two opposing surfaces or substrates, especially if the bond is to harden rapidly. The esters of 2-cyanoacrylic acid, sometimes abbreviated to "cyanoacrylate adhesives", are also commonly called "quick-set adhesives" owing to the normally very rapid setting behavior thereof, since they generally harden after a few seconds when used, or the joined parts, exhibit at least a certain degree of initial strength. As is known, the setting of cyanoacrylate adhesives is initiated by an anionic polymerisation reaction. However, in the case of some substrates, especially in the case of acid substrates, such as wood or paper, that polymerisation reaction may be very greatly delayed. Moreover, the two materials mentioned exhibit a pronounced tendency to draw the adhesive, which is often highly liquid, out of the joint gap by capillary action before hardening has taken place in the gap. Even in cases in which, for reasons of geometry, the adhesive must be applied in a relatively thick layer in the joint gap or in cases where, intentionally or unintentionally, relatively large amounts of adhesive are so applied that, for example, relatively large drops of adhesive protrude from between the parts to be joined, rapid hardening throughout may rarely be achieved.

Numerous attempts have already been made to accelerate the polymerisation for such applications by means of certain additives. The methods used may roughly be divided into three categories:

Addition of accelerators directly to the adhesive formulation. Such is possible to only a very limited extent, however, since substances having a basic or nucleophilic action, which would normally bring about a pronounced acceleration of the polymerisation of the cyanoacrylate adhesive, are generally used at the expense of the storage stability of such compositions.

The second method which is generally followed is the addition of the abovementioned accelerators shortly before application of the adhesive in virtually a two-component system. However, such method has the disadvantage that the working life is limited after the activator has been mixed in. In addition, with the small amounts of activator that are required, the necessary accuracy of metering and homogeneity of mixing are difficult to achieve.

A third process which is generally employed is the use of activators in the form of a dilute solution. The solution is either sprayed beforehand onto the parts which are to be bonded or is sprayed onto the places where the adhesive is still liquid after the substrates have been joined. The solvents used for such dilute solutions of activators are generally low-boiling organic solvents.

For the first solution, JP-A-10140091, for example, proposes the use of crown ethers or polyalkylene oxides as an accelerating additive in cyanoacrylate adhesive mixtures. DE-A-40 09 621 proposes the use of certain cyclodextrin derivatives, some of which are soluble in cyanoacrylates, as an additive. U.S. Pat. No. 4,718,966 proposes the addition of calixarene compounds as additive accelerators in cyanoacrylate adhesive compositions and GB-A-2 200 124 proposes the use of acyclic phenol-formaldehyde oligomers as an accelerating additive for cyanoacrylate adhesive formulations.

U.S. Pat. No. 4,460,759 proposes two-component adhesive compositions in which one component contains the cyanoacrylate monomer and the second component contains a weakly acid or weakly basic ionic accelerator consisting of a cation having a pKa of at least 10 and a nucleophilic anion.

For the third method, the use of accelerator solutions, JP-A-62 022 877 proposes the use of solutions of lower fatty amines, aromatic amines, dimethylamine and the like. JP-A-03 207 778 proposes the use of solutions of aliphatic, alicyclic and, especially, tertiary aromatic amines; particular examples which are mentioned are N,N-dimethylbenzylamine, N-methylmorpholine and N,N-diethyltoluidine.

The last-mentioned compound, N,N-dimethyl-p-toluidine, is practically the only compound used almost exclusively worldwide for a long time as an accelerator substance in the case of the accelerated hardening of cyanoacrylate adhesives. When subsequently applied to the joined parts, the substance causes even relatively large amounts of adhesive to harden within seconds. The polycyanoacrylate so formed is completely free of turbidity. Crucial disadvantages of the use of that substance are the very high volatility of the substance, which does not permit long waiting times between application of the accelerator solution beforehand to the substrates to be bonded and the subsequent bonding process. A further crucial disadvantage is the pronounced toxicity of that compound, which must be labelled "T" in accordance with the law on chemicals.

Experience has shown that the basicity or nucleophilicity of the accelerator substances as the sole selection criterion is not sufficient for achieving solutions which are acceptable in practice in terms of application technology. Many substances, such as alkylamines, triphenylphosphane, 1,2-di-(4-pyridyl-ethane), 4,4'-dipyridyl disulfide, 3-(3-hydroxypropyl)pyridine, 1,2-bis(diphenylphosphino)-ethane, pyridazine, methylpyridazine or 4,4'-dipyridyl, are so basic or nucleophilic that spontaneous superficial hardening takes place at the adhesive interface (shock hardening) before the activator is able to initiate polymerisation throughout the liquid adhesive layer by convection and diffusion. With other compounds, such as oxazoles, the basicity is evidently too low. The result, in the case of shock hardening, is an often cloudy hardening which takes place only at the surface, and in the case of the last-mentioned compound the hardening is much too slow for practical purposes.

DE-A-22 61 261 proposes accelerator substances containing the structural element —N=C—S—. Series of tests using compounds containing that atomic grouping do in fact show that even relatively large amounts of adhesive harden relatively rapidly and reliably. In comparison with the above-mentioned "classic", N,N-dimethyl-p-toluidine, the activating effect is, however, markedly less pronounced in the case of almost all the readily obtainable substances according to DE-A-22 61 261, so that significantly longer waiting times for setting must be accepted. Only 2,4-dimethylthiazole exhibits a very good accelerating action. However, that compound has a very high volatility, so that activator solutions based thereon are unsuitable for application beforehand since the active ingredient also evaporates off with the solvent.

The object was, therefore, to find new activator substances for use in the case of cyanoacrylate adhesive bonds, which activator substances have a pronounced accelerating action and low volatility, so that application beforehand is also possible. In addition, that compound is to be less harmful in terms of work hygiene than N,N-dimethyl-p-toluidine, which is at present still used on a large scale.

DESCRIPTION OF THE INVENTION

The manner in which this object is achieved according to the present invention will be found in the patent claims. It consists essentially in using for the preparation of activator solutions activators containing the structural element —N=C—S—S— or the structural element —N=C—S—S—C=N—, wherein the N=C double bond need not necessarily be a typical double bond, but may also be part of an aromatic π-system.

Particular examples of such compounds are dibenzodiazyl disulfide, 6,6'-dithiodinicotinic acid, 2,2'-dipyridyl disulfide or bis(4-t-butyl-1-isopropyl-2-imidazolyl) disulfide. According to the present invention, the activators are dissolved in readily volatile solvents, such as hydrocarbons, carboxylic acid esters, ketones, ethers or halogenated hydrocarbons. The solutions of the activators contain the activator compound in concentrations of from 0.01 to 10 g per 100 ml of solvent; preferably, from 0.1 to 5 g of activator substance are dissolved per 100 ml of solvent.

A large number of conventional organic solvents are suitable as solvents for the activators according to the present invention, provided they have a sufficiently high volatility. That means that the boiling point of the solvent is to be below 120° C., preferably below 100° C., at normal pressure. Particular examples of suitable solvents are specialized boiling point gasolines, but especially n-heptane, alkyl esters of lower carboxylic acids, for example ethyl acetate, isopropyl acetate, butyl acetate, ketones, such as acetone, methyl isobutyl ketone and methyl ethyl ketone. Also suitable are ethereal solvents, ether esters or cyclic ethers, such as, especially, tetrahydrofuran.

On the other hand, in the case of sparingly soluble activators, chlorinated hydrocarbons, such as dichloromethane or trichloromethane (chloroform), may also be used, however.

The activator solutions according to the present invention are suitable for the accelerated hardening of all conventional cyanoacrylate adhesives which contain as the fundamental constituent one or more cyanoacrylic acid esters, inhibitors of free-radical polymerisation, inhibitors of anionic polymerisation and, optionally, conventional auxiliary substances employed in such adhesive systems.

The cyanoacrylic acid esters used in the adhesives are in the main one or more esters of 2-cyanoacrylic acid. Such esters correspond to the following general formula:

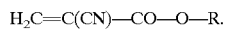

In that formula, R represents an alkyl, alkenyl, cycloalkyl, aryl, alkoxyalkyl, aralkyl or haloalkyl group, especially a methyl, ethyl, n-propyl, isopropyl, n-butyl, isobutyl, pentyl, hexyl, allyl, methallyl, crotyl, propargyl, cyclohexyl, benzyl, phenyl, cresyl, 2-chloroethyl, 3-chloropropyl, 2-chlorobutyl, trifluoroethyl, 2-methoxyethyl, 3-methoxybutyl or 2-ethoxyethyl group. The above-mentioned cyanoacrylates are known to a person skilled in the art of adhesives, see Ullmann's Encyclopaedia of Industrial Chemistry, Volume A1, p. 240, Verlag Chemie Weinheim (1985) and U.S. Pat. No. 3,254,111 and U.S. Pat. No. 3,654,340. Preferred monomers are the allyl, methoxyethyl, ethoxyethyl, methyl, ethyl, propyl, isopropyl or butyl esters of 2-cyanoacrylic acid. The monocyanoacrylic acid esters represent the largest proportion by weight of the polymerisable monomers in the adhesive.

The mentioned cyanoacrylic acid esters are present in the adhesives in amounts of from 99.99 to 90 wt. %. Preference is given to cyanoacrylic acid esters the alcohol radical of which is derived from alcohols having from 1 to 10 carbon atoms, which may also be cyclic, branched or perfluorinated.

The cyanoacrylate adhesives according to the present invention may also contain an inhibitor of free-radical polymerisation. Such inhibitors are, for example, hydroquinone, p-methoxyphenol, but also sterically-hindered phenols, phenothiazine and the like.

The cyanoacrylate adhesives according to the present invention may also contain thickeners as further auxiliary substances. That is desirable especially when there are to be bonded porous materials which otherwise readily absorb the low viscosity adhesive. Many types of polymer may be used as thickeners, such as polymethyl methacrylate, other methacrylate copolymers, acrylic rubber, cellulose derivatives, polyvinyl acetate or polyalphacyanoacrylate. A usual amount of thickener is generally about 10 wt. % or less, based on the total adhesive. In addition to or instead of the thickeners, the cyanoacrylate adhesives according to the present invention may also contain reinforcing agents. Examples of such reinforcing agents are acrylic elastomers, acrylonitrile copolymers, elastomers or fluoroelastomers. Moreover, inorganic additives may also be used, for example silicates, thixotropic agents having a large surface area, which are preferably coated with polydialkylsiloxanes.

The cyanoacrylate adhesives according to the present invention may also contain substances for increasing the thermal stability thereof. There may be used for that ipurpose, for example, the sulfur compounds mentioned in EP 579 476.

In addition to or instead of the mentioned additives, the cyanoacrylate adhesives according to the present invention may also contain plasticisers. These serve to protect the resulting adhesive bond from brittleness. Such plasticisers are, for example, $C_1$–$C_{10}$ alkyl esters of dibasic acids, especially of sebacic acid, phthalic acid or malonic acid. Other plasticisers are diaryl ethers and polyurethanes and the like. Furthermore, the adhesive preparations according to the present invention may also contain colorings, pigments, aromatic substances, extenders and the like.

The present invention will now be illustrated in greater detail by means of Examples.

EXAMPLES

In order to study the effectiveness of the activator solutions and of other basic, activating compounds, the hardening speed of a commercially available cyanoacrylate adhesive on aluminum sheets was tested (highly viscous Sicomet 63 from Sichel-Werke, Hannover). A bead having a volume of 0.25 ml and dimensions of 9 cm×0.8 cm was applied in each case. For results, see Table 1. Application of the activator: 1 second from a spray bottle; spraying distance 35 cm.

TABLE 1

Hardening times of cyanoacrylate adhesive after application of various polymerisation-initiating compounds

| Example | Activator | Solution | Hardening speed/ Comments |
|---|---|---|---|
| 1 | 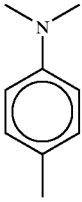<br>N,N'-dimethyl-p-toluidine | 0.4 g/100 ml of n-heptane | 15 s |
| 2 | 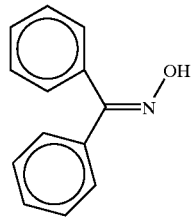 | 0.4 g/100 ml of ethyl acetate | 60 s (spontaneous superficial hardening; but full hardening only after about 60 s) |
| 3 | 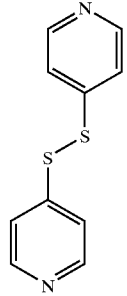<br>4,4'-dipyridyl disulfide | 0.4 g/100 ml of ethyl acetate | (spontaneous, cloudy superficial hardening; but full hardening only after several minutes) |
| 4 | 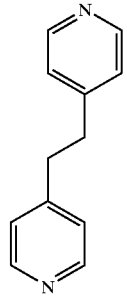<br>1,2-di-(4-pyridylethane) | 0.4 g/100 ml of ethyl acetate | (spontaneous, cloudy superficial hardening; but full hardening only after several minutes) |
| 5 | 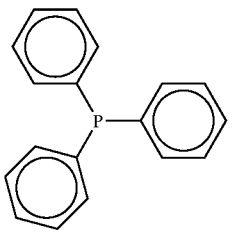<br>triphenylphosphane | 0.4 g/100 ml of ethyl acetate | (spontaneous, cloudy superficial hardening; but full hardening only after several minutes) |

TABLE 1-continued

Hardening times of cyanoacrylate adhesive after application of various polymerisation-initiating compounds

| Example | Activator | Solution | Hardening speed/ Comments |
|---|---|---|---|
| 6 | pyridine-2-thiol | 0.4 g/100 ml of ethyl acetate | about 180 s |
| 7 | 2,4-dimethyl-thiazole | 0.4 g/100 ml of ethyl acetate | 5 s |
| 8 | (2-mercapto-thiazoline) | 0.4 g/100 ml of ethyl acetate | 90 s |
| 9 | dimercapto-thiadiazole | 0.4 g/100 ml of ethyl acetate | about 300 s |
| 10 | N-t-butyl-2-benzothiazole-sulfenamide | 0.4 g/100 ml of n-heptane | 45 s |
| 11 | N-t-butyl-2-benzothiazole-sulfenamide | 0.4 g/100 ml of ethyl acetate | 50 s |
| 12 | N-cyclohexyl-2-benzothiazole-sulfenamide | 0.4 g/100 ml of n-heptane | 50 s |
| 13 | N-cyclohexyl-2-benzothiazole-sulfenamide | 0.4 g/100 ml of ethyl acetate | 50 s |
| 14 | dibenzothiazyl disulfide | 0.4 g/100 ml of trichloromethane | 15 s |
| 15 | dibenzothiazyl disulfide | 0.4 g/100 ml of dichloromethane | 15 s |

TABLE 1-continued

Hardening times of cyanoacrylate adhesive after application of various polymerisation-initiating compounds

| Example | Activator | Solution | Hardening speed/Comments |
|---|---|---|---|
| 16 | dithiodinicotinic acid (HOOC-pyridine-S-S-pyridine-COOH) | 0.4 g/100 ml of tetrahydrofuran | 30 s |
| 17 | bis(4-t-butyl-1-isopropyl-2-imidazolyl) disulfide | 0.4 g/100 ml of dichloromethane | 15 s |
| 18 | 2,2'-dipyridyl disulfide | 0.4 g/100 ml of n-heptane | 10 s |
| 19 | 2,2'-dipyridyl disulfide | 0.4 g/100 ml of ethyl acetate | 15 s |

TABLE 2

Setting speed on aluminum strips (degreased; 10 × 2 cm) after corresponding waiting time (after evaporation of the solvent) (the viscous CA adhesive Sicomet 63 was used):

| Solvent used (see Table 1) | Setting time after 5 minute's waiting time | Setting time after 10 minute's waiting time |
|---|---|---|
| 1 | >60 s | >60 s |
| 7 | >60 s | >60 s |
| 10 | 1 s | 2 s |
| 12 | 1 s | 1 s |
| 14 | 1 s | 2 s |
| 16 | 10 s | 12 s |
| 17 | 1 s | 1 s |
| 18 | 3 s | 3 s |
| without pretreatment | >60 s | >60 s |

Examples 1 to 13 are comparison examples which are not in accordance with the present invention. Example 1 is the conunon widely used activator according to the prior art. Examples 2 to 5 show that a large number of substances having an activating action are unsuitable for practical purposes since, although they lead to spontaneous superficial hardening, full hardening requires a very long time. The activators according to Examples 6 to 13 correspond to the teaching of DE-A-22 61 261. Table 1 shows that the activators of Examples 6 and 8 to 13 have only a slight accelerating action; although the activator of Example 7 has a very high setting speed, as will be seen from Table 2, it does not permit a prolonged waiting time between application of the activator (after evaporation of the solvent) and application of the adhesive and joining of the adhesive joint.

The activators according to the present invention of Examples 14 to 19 have a pronounced accelerating action (which is shown by the very high hardening speed, see Table 1) and, at the same time, they permit a long waiting time between application of the activator and application of the adhesive (see Table 2).

In contrast to the activators of the prior art, which either have a poor accelerating action or have an adequate accelerating action, but are too highly volatile, the substances according to the present invention do not exhibit those disadvantages, because they have the following profile of properties:

Hardening takes place in a few seconds. It is generally more rapid than in the case of the compounds containing the atom grouping —N═C—S— (see DE-A-22 61 261). In that connection, it is interesting to compare the compounds from Example 6, pyridine-2-thiol, and Examples 18/19, both from Table 1: 2,2'-dipyridyl disulfide having the structural element —N═C—S—S—C═N— has optimum activating action and is chemically very similar to pyridine-2-thiol, which contains the —N═C—S— grouping, but which has a markedly poorer activating action (2,2'-dipyridyl disulfide corresponds to the reaction product readily obtainable by mild oxidation of pyridine-2-thiol).

Hardening is not too rapid; that it to say, brittle shock hardening is avoided and therefore:

Polymerised cyanoacrylate is clear, transparent, not cloudy.

The compounds in the form of solutions thereof may be applied even before bonding of the parts to be joined. The surfaces of the material are still activated even after a waiting time of several minutes.

What is claimed is:

1. A process for bonding two or more substrates, comprising the steps of:

(a) applying to a first substrate surface to be bonded an activator for accelerated hardening of a cyanoacrylate adhesive, said activator comprising an organic solvent and one or more organic activator compounds containing the structure —N=C—S—S—, wherein N=C represents a carbon-nitrogen double bond or a carbon-nitrogen π-bond;

(b) applying a cyanoacrylate adhesive composition to the first substrate surface to be bonded or to a second substrate surface to be bonded to the first substrate surface; and (c) joining the first and second substrate surfaces to form a bond between the surfaces.

2. The process of claim 1, wherein prior to step (c), the organic solvent is at least partially evaporated.

3. The process of claim 2, wherein the evaporation is aided by heat or air flow.

4. The process of claim 1, wherein the substrates are joined in (c) with mechanical fixing.

5. The process of claim 1, wherein the activator is applied to the first substrate surface by a spray device, brush, stirring rod, or spatula.

6. The process of claim 1, wherein prior to step (c), the activator is applied to the second substrate surface.

7. The process of claim 1, wherein the activator is applied by partial or whole immersion of the substrate in the activator.

8. The activator of claim 1, in the form of a solution.

9. A process for bonding two or more substrates, comprising the steps of:

(a) applying to a first substrate surface that is at least partly applied with a cyanoacrylate adhesive composition an activator for accelerated hardening of a cyanoacrylate adhesive, said activator comprising an organic solvent and one or more organic activator compounds containing the structure —N=C—S—S—, wherein N=C represents a carbon-nitrogen double bond or a carbon-nitrogen π-bond; and (c) joining the first substrate surface with the adhesive composition and activator applied to a second substrate surface to form a bond between the surfaces.

10. The process of claim 9, wherein the activator is applied directly to the adhesive composition applied to the first substrate surface.

11. The process of claim 9, wherein the activator is applied to the second substrate surface before being applied to the adhesive composition applied to the first substrate surface.

12. The process of claim 1, wherein the activator is applied after the substrates have been joined.

13. A method of bonding two or more substrates, comprising the steps of activating a cyanoacrylate adhesive with an activator for accelerated hardening of a cyanoacrylate adhesive, said activator comprising an organic solvent and one or more organic activator compounds containing the structure —N=C—S—S—, wherein N=C represents a carbon-nitrogen double bond or a carbon-nitrogen π-bond, and bonding two or more substrates with the activated cyanoacrylate adhesive.

14. A method of using an activator comprising an organic solvent and one or more organic activator compounds containing the structure —N=C—S—S—, wherein N=C represents a carbon-nitrogen double bond or a carbon-nitrogen π-bond, for activating a cyanoacrylate adhesive, comprising the steps of providing said adhesive, providing said activator, and activating said adhesive with said activator.

15. An activator for accelerated hardening of a cyanoacrylate adhesive, comprising an organic solvent and one or more organic activator compounds containing the structure —N=C—S—S—, wherein N=C represents a carbon-nitrogen double bond or a carbon-nitrogen π-bond.

16. The activator of claim 15, wherein the organic activator compound containing the structure —N=C—S—S— contains the structure —N=C—S—S—C=N—.

17. The activator of claim 16, comprising one or more organic activator compounds selected from the group consisting of dibenzothiazyl disulfide, 6,6'-dithionicotinic acid, 2,2'-dipyridyl disulfide, and bis(4-t-butyl-1-isopropyl-2-imidazolyl) disulfide.

18. The activator of claim 16, wherein the organic solvent comprises one or more solvents selected from the group consisting of volatile hydrocarbons, carboxylic acid esters, ketones, ethers, and halogenated hydrocarbons.

19. The activator of claim 16, comprising 0.01 to 10 grams of organic activator compound or compounds per 100 ml of solvent.

20. The activator of claim 19, comprising 0.1 to 5 grams of organic activator compound or compounds per 100 ml of solvent.

* * * * *

UNITED STATES PATENT AND TRADEMARK OFFICE
CERTIFICATE OF CORRECTION

PATENT NO. : 6,547,917 B1
DATED : April 15, 2003
INVENTOR(S) : Misiak et al.

It is certified that error appears in the above-identified patent and that said Letters Patent is hereby corrected as shown below:

Column 11,
Line 27, delete "claim 1" and insert therefore -- claim 15 --.

Signed and Sealed this

Twenty-sixth Day of October, 2004

JON W. DUDAS
*Director of the United States Patent and Trademark Office*